United States Patent
Huang

(10) Patent No.: US 6,763,542 B2
(45) Date of Patent: Jul. 20, 2004

(54) MULTI-FUNCTION FIRE FIGHTING TOOL

(76) Inventor: Chun-Hao Huang, No. 18, Lane 109, Jen Tzu Road, Jen Wu Hsiang, Kaohsiung Hsien (TW)

(*) Notice: Subject to any disclaimer, the term of this patent is extended or adjusted under 35 U.S.C. 154(b) by 46 days.

(21) Appl. No.: 10/190,674

(22) Filed: Jul. 9, 2002

(65) Prior Publication Data
US 2004/0006824 A1 Jan. 15, 2004

(51) Int. Cl.⁷ .................................................. B25F 1/02
(52) U.S. Cl. .............................................. 7/116; 7/161
(58) Field of Search ........................... 7/116, 161, 169, 7/170

(56) References Cited

U.S. PATENT DOCUMENTS

| | | | | |
|---|---|---|---|---|
| 2,102,133 A | * | 12/1937 | Schoenberger | 7/116 |
| 2,368,792 A | * | 2/1945 | Willman | 42/94 |
| 2,371,977 A | * | 3/1945 | Pearce | 7/116 |
| 2,630,591 A | * | 3/1953 | Smith | 15/105 |
| 3,325,835 A | * | 6/1967 | Burns et al. | 7/161 |
| 4,208,793 A | * | 6/1980 | Sinnott | 30/299 |
| 5,105,493 A | * | 4/1992 | Lugtenaar | 7/116 |
| 6,289,540 B1 | * | 9/2001 | Emonds | 7/116 |

* cited by examiner

Primary Examiner—Joseph J. Hail, III
Assistant Examiner—David B. Thomas
(74) Attorney, Agent, or Firm—Rosenberg, Klein & Lee

(57) ABSTRACT

A fire fighting tool includes a spade, a fire extinguishing member, and a fork like insertion member. The spade consists of a handle and a blade connected to the handle; the blade has a cutting edge for cutting objects, and hooked portions on a second edge opposite the cutting edge for hooking objects. The blade further has a convexly curved portion on the second edge, which can be used as a fulcrum in disengaging the hooked portions from holes of a rugged land after the same have been engaged with the holes. The fire extinguishing member has several metal plates for hitting fire, and is detachably joined to the other end of the handle. The fork like member is detachably connected to the handle for the handle to be used as a walking stick after the fire extinguishing member is removed.

7 Claims, 5 Drawing Sheets

MULTI-FUNCTION FIRE FIGHTING TOOL

BACKGROUND OF THE INVENTION

1. Field of the Invention

The present invention relates to a multi-function fire fighting tool, and more particularly to a fire fighting tool, which can be adapted for performing various functions according to need of the fire fighters, and can be dismantled for easy storage and transportation.

2. Brief Description of the Prior Art

When forest fire happens, fire fighters have to walk to the scene, and make a fire lane for preventing fire from spreading as well as try to extinguish the fire with hands and various simple tools because the roads in forests are usually too small for fire trucks to travel on.

Fire fighters usually have to carry spades, long sticks with hooks, axes, and broom like fire extinguishing tools. Spades are used for digging trenches, removing weeds, shovel earth onto fire and so on. Long sticks with hooks are used for hooking tree branches down, and moving weeds or branches together. Axes are used for cutting tree branches, and can be used for helping fire fighters walk or climb on slopes or uneven lands. And, broom like fire extinguishing tools are used for extinguishing small fires which just begin burning.

Consequently, to fight forest fire, fire fighters have to carry many outfits that are very heavy in weight together, costing them a lot of physical strength and delaying their arrival at the scene. Nevertheless, fire fighters have to carry the entire fire fighting outfit, otherwise performance of the fire fighters would be affected for the worse.

SUMMARY OF THE INVENTION

It is a main object of the present invention to provide a fire fighting tool, which can be adapted for performing various functions according to need of fire fighters so that each fire fighter only have to carry one such tool to the scene of forest fire, saving him a lot of physical strength.

It is another object of the present invention to provide a fire fighting tool that can be dismantled for easy storage and transportation.

The fire fighting tool includes a spade, a fire extinguishing member, and a fork like insertion member. The spade consists of a handle and a blade connected to the handle; the handle can be dismantled; the blade has a cutting edge for cutting objects, and hooked portions on a second edge opposite the cutting edge for hooking objects. The blade further has a convexly curved portion on the second edge. The fire extinguishing member has several metal plates for hitting fire, and is detachably joined to the other end of the handle. The fork like member can be connected to the handle after the fire extinguishing member is removed.

BRIEF DESCRIPTION OF THE DRAWINGS

The present invention will be better understood by reference to the accompanying drawings, wherein.

DETAILED DESCRIPTION OF THE PREFERRED EMBODIMENTS

Figure 1:
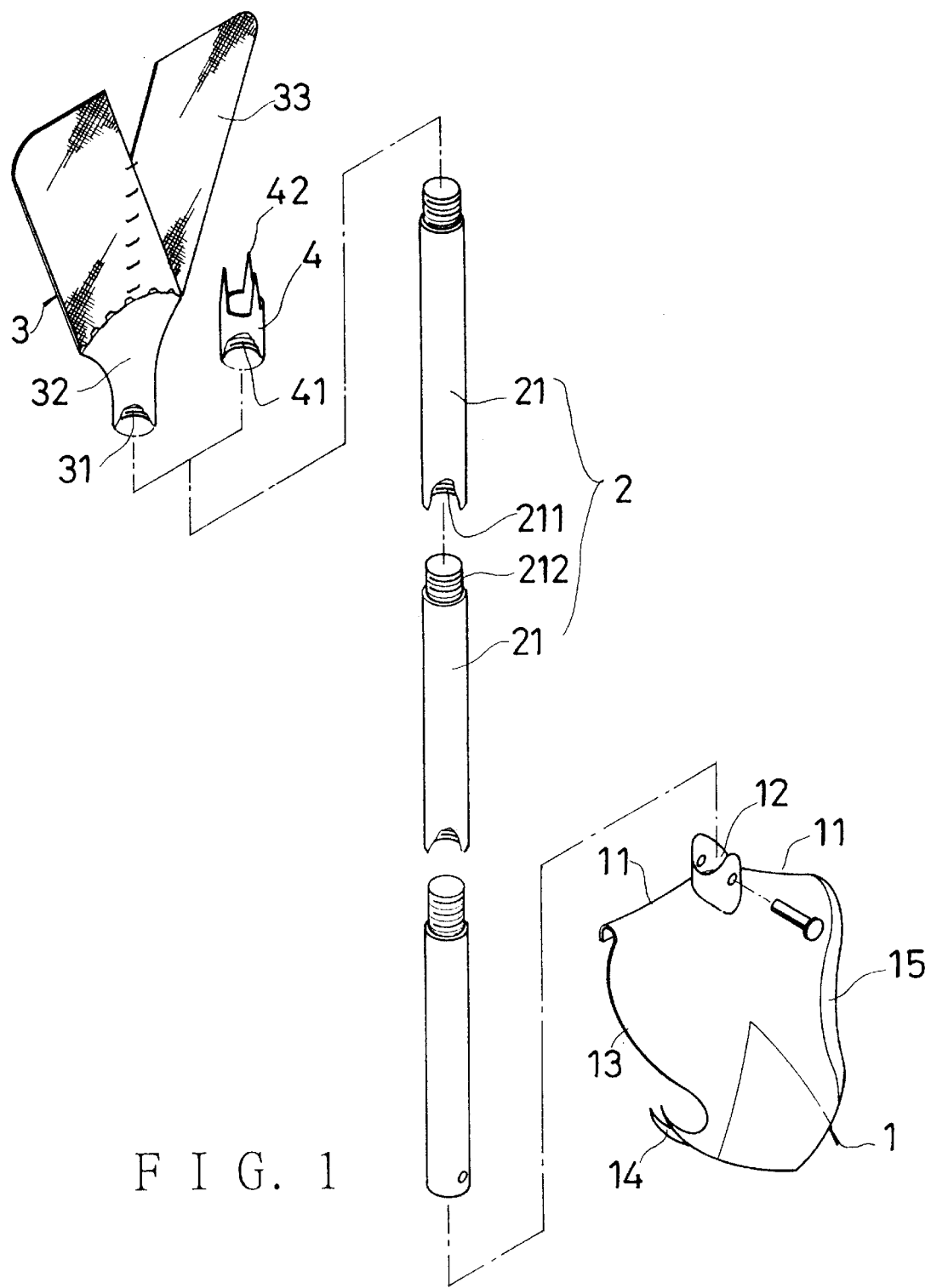
FIG. 1 is an exploded perspective view of the multi-function fire fighting tool of the present invention.

Referring to FIG. 1, a fire fighting tool according to the present invention includes a fire extinguishing member 3, an insertion member 4, and a spade, which consists of a handle 2 and a blade 1 connected to a first end of the handle 2.

The blade 1 is formed with a cutting edge 15 on a lateral side for cutting objects. Hooked portions 14 are formed on a second edge opposite the cutting edge 15 of the blade 1 for hooking objects; the hooked portions 14 are preferably formed with two points at the outward portion so as to look like front ends of snakes' tongues. In addition, the blade 1 has a convexly curved portion 13 on the second edge. The hooked portions 14 can be hooked onto holes of rugged slopes or trunks of trees for helping fire fighters move along the rugged slopes or climb up trees. The convexly curved portion 13 can be used as a fulcrum in disengaging the hooked portions 14 from holes of rugged slopes when the hooked portions 14 are used for helping the fire fighter move along rugged slopes in above mentioned way. The blade 1 of the spade is further formed with a connecting neck 12 between two shoulder portions 11 thereof for allowing the handle 2 to be tightly passed into.

The handle 2 consists of several connecting rods 21 detachably joined together; each of the connecting rods 21 is provided with threads 211, and 212 at an inner side of one hollow end, and an outer side of the other end thereof respectively. Thus, the connecting rods 21 can be separably joined together by means of screwing the threaded ends into the threaded holes.

The fire extinguishing member 3 consists of a connecting portion 32 and several metal plates 33 for hitting fire; the metal plates 33 can be made by means of weaving metal wires together that are connected to the connecting portion 32. The connecting portion 32 has a hollow portion having threads 31 on the inner side so that the fire extinguishing member 3 can be detachably joined to an outermost threaded end of the handle 2 by means of screwing the connecting portion 32 onto the threaded end.

The insertion member 4 includes a hollow connecting portion, and a fork-shaped portion 42 having several points; the hollow connecting portion is formed with threads 41 on the inner side; the fork-shaped portion 42 is preferably formed with three points. Thus, the insertion member 4 can be detachably connected to the outermost threaded end of handle 2 after the fire extinguishing member 3 has been removed from the handle 2.

Figure 2:
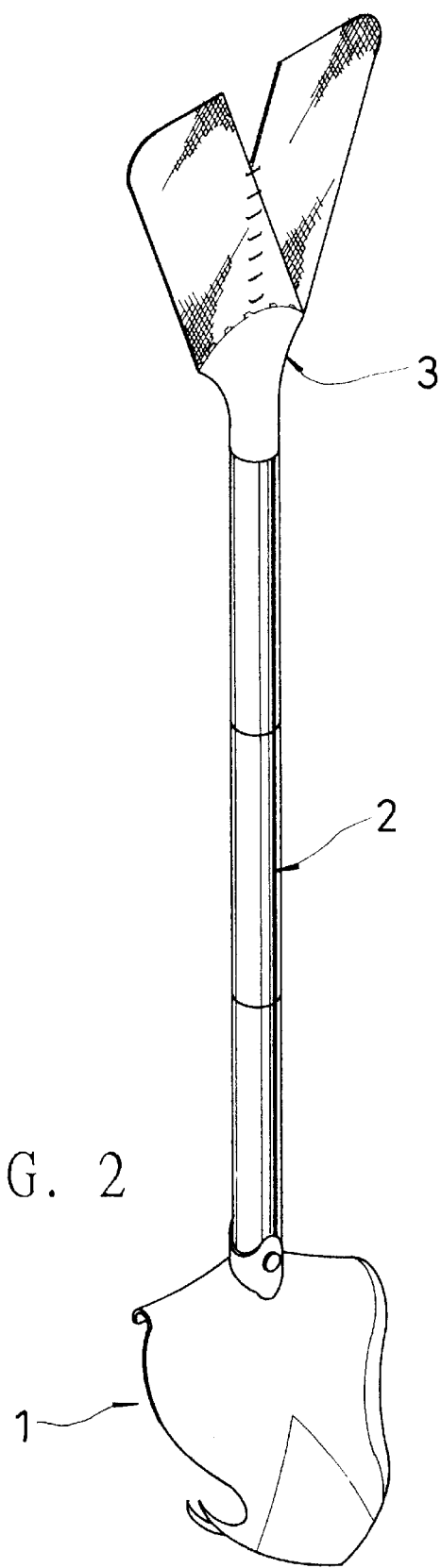
FIG. 2 is a front view of the multi-function fire fighting tool of the present invention.
Figure 3:
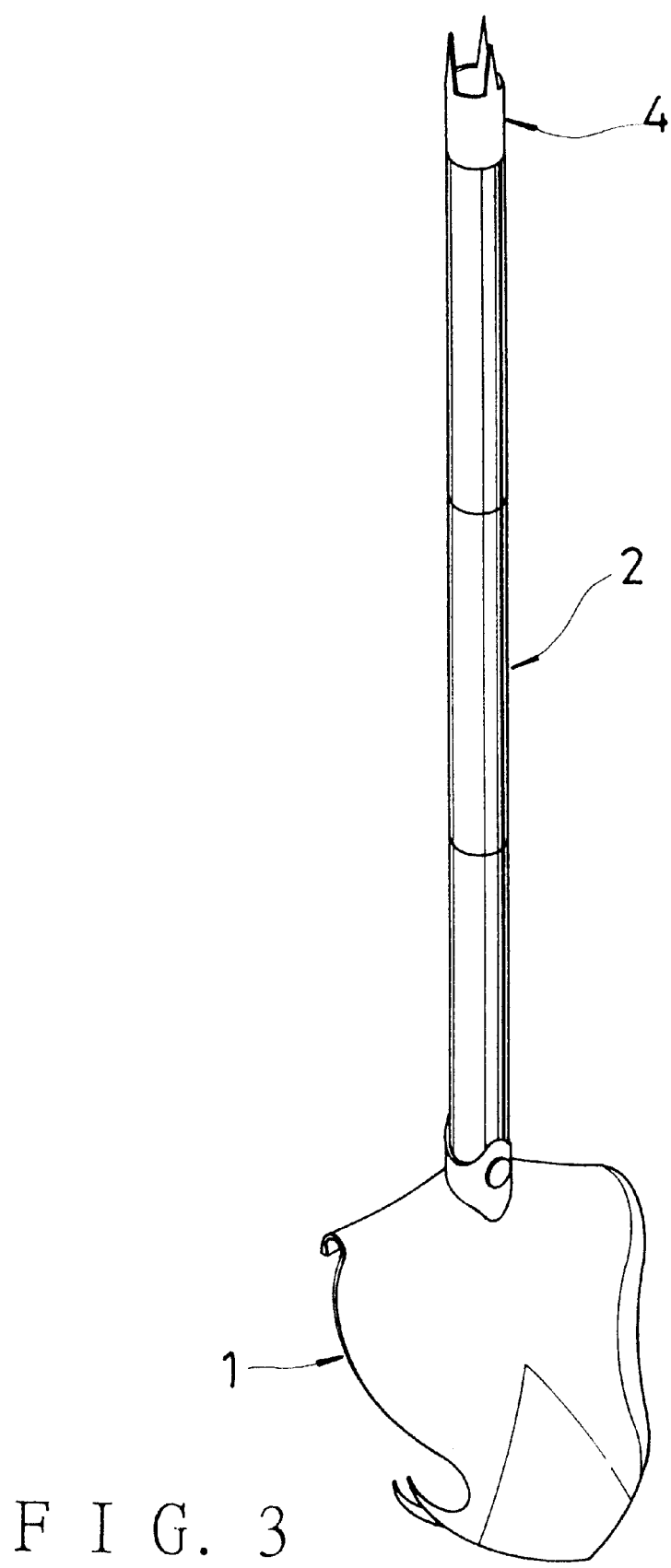
FIG. 3 is a front view of the multi-function fire fighting tool of the second embodiment.
Figure 4:
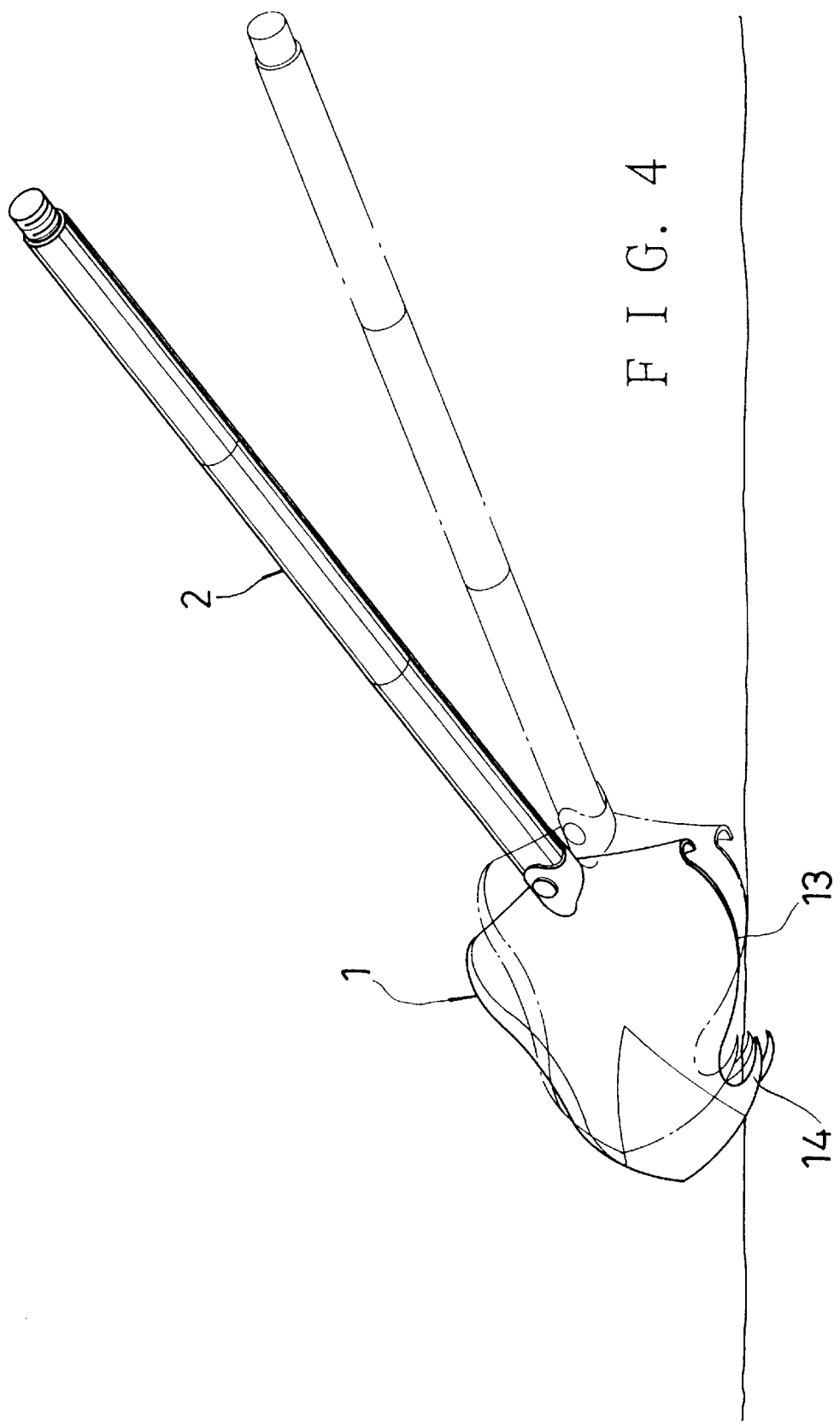
FIG. 4 is a view showing use of the multi-function fire fighting tool of the present invention; and, FIG. 5 is a view showing another use of the multi-function fire fighting tool of the present invention.
Figure 5:
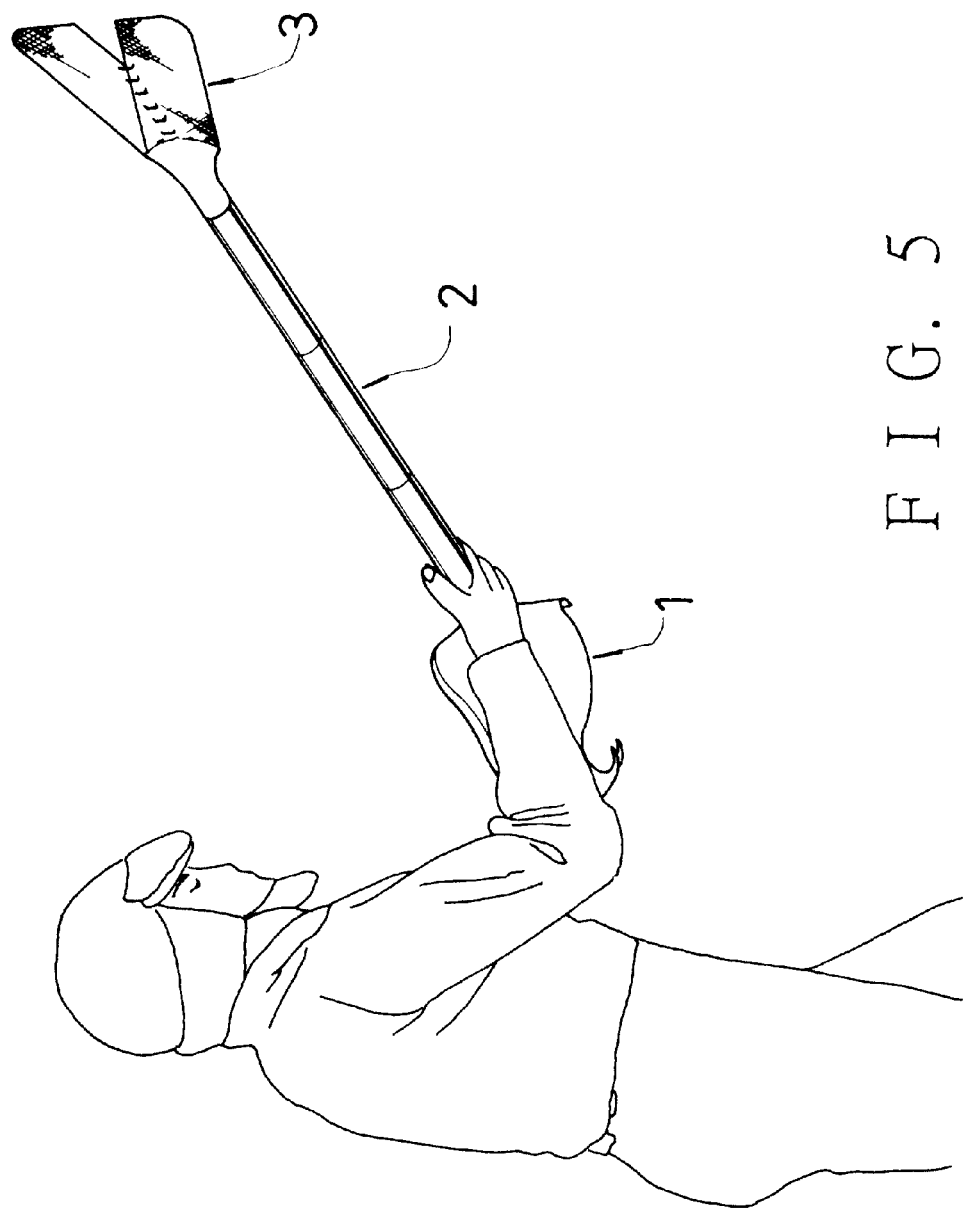

Therefore, when the fire extinguishing member 3 is joined to the handle 2, a fire fighter can use the same to hit small fires to put out the same, as shown in FIGS. 2, and 5. And, when the insertion member 4 is joined to the handle 2 as shown in FIG. 3, the present tool can be used as a walking stick to help a fire fighter walk oil rugged lands.

From the above description, it can be easily seen that the present fire fighting tool has many functions, and can be readily dismantled for easy storage and transportation. And, the tool of the present invention can be carried easily because it is relatively light in weight as compared with a conventional fire fighting outfit, which includes a spade, an axe, hooks, and a fire extinguishing broom, saving fire fighters a lot of physical strength and allowing them to walk to the scene faster.

What is claimed is:

1. A fire fighting toot comprising:

a spade including a handle and a blade connected to a first end of the handle; the blade having a cuffing edge formed along a first edge for the blade having hooked portions formed to extend from a second edge opposite the cutting edge; the blade having a convexly curved portion formed on the second edge to be used as a fulcrum in disengaging the hooked portions during use; and, a fire extinguishing member and an insertion member alternatively connected in detachable manner to a second end of the handle; the fire extinguishing member having a connecting portion and a plurality of metal plates extending therefrom for smothering a flame;

the insertion member including a fork-shaped portion defining a plurality of points.

2. The fire fighting tool as claimed in claim 1, wherein the blade of the spade is formed with a connecting neck disposed between two shoulder portions thereof for engaging the first end of the handle.

3. The fire fighting tool as claimed in claim 1, wherein the connecting portion of the fire extinguishing member has threads formed on an inner side thereof, and the second end of the handle is formed with threads around an outer side thereof to be screwed into the connecting portion.

4. The fire fighting tool as claimed in claim 1, wherein the metal plates of the fire extinguishing member are made of metal wires woven together.

5. The fife fighting tool as claimed in claim 1, wherein the insertion member has threads formed on an inner side thereof, and the second end of the handle is formed with threads round an outer side thereof screwed engagement of into the insertion member.

6. The fire fighting tool as claimed in claim 1, wherein the handle includes a plurality of connecting rods detachably joined together.

7. The fire fighting tool as claimed in claim 6, wherein each of the connecting rods is provided with threads at an inner side of one end, and an outer side of an opposed end thereof.

* * * * *